(12) United States Patent
Wang et al.

(10) Patent No.: US 9,804,332 B1
(45) Date of Patent: Oct. 31, 2017

(54) MULTI-CHANNEL WAVELENGTH DIVISION MULTIPLEXING/DEMULTIPLEXING DEVICE

(71) Applicant: BROWAVE CORPORATION, Hsinchu (TW)

(72) Inventors: Yu-Wen Wang, Hsinchu (TW); Chang-Yi Peng, Hsinchu (TW); Yeong-Her Chen, Hsinchu (TW)

(73) Assignee: BROWAVE CORPORATION, Hsinchu (TW)

( * ) Notice: Subject to any disclaimer, the term of this patent is extended or adjusted under 35 U.S.C. 154(b) by 0 days.

(21) Appl. No.: 15/481,517

(22) Filed: Apr. 7, 2017

(51) Int. Cl.
*G02B 6/28* (2006.01)
*G02B 6/293* (2006.01)
*G02B 6/32* (2006.01)
*G02B 27/09* (2006.01)

(52) U.S. Cl.
CPC ....... *G02B 6/29365* (2013.01); *G02B 6/2938* (2013.01); *G02B 6/32* (2013.01); *G02B 27/0927* (2013.01)

(58) Field of Classification Search
CPC . H04J 14/02; H04Q 11/0005; G02B 6/12007; G02B 6/2938; G02B 6/29395; G02B 6/28
See application file for complete search history.

(56) References Cited

U.S. PATENT DOCUMENTS

| 7,031,610 | B2* | 4/2006 | Honda | G02B 6/29365 385/24 |
| 7,212,343 | B1* | 5/2007 | He | G02B 6/29365 359/618 |
| 8,588,606 | B2* | 11/2013 | Watte | G01M 11/3118 398/10 |
| 9,482,819 | B2* | 11/2016 | Li | G02B 6/29365 |
| 9,575,255 | B2* | 2/2017 | Chen | G02B 6/354 |

\* cited by examiner

*Primary Examiner* — Jennifer Doan
(74) *Attorney, Agent, or Firm* — Lin & Associates Intellectual Property, Inc.

(57) ABSTRACT

A multi-channel wavelength division multiplexing/demultiplexing device includes optical filters for respective optical channels, and at least one microlens. The optical filters guide a light beam to travel along a preset optical path, and each optical filter filters a specific and different range of wavelength, and has a first surface for incident and reflective light, and a second surface for outgoing light through penetration as an output beam for the corresponding channel. Each microlens is installed between two adjacent optical filters to adjust optical beam shape of the traveling light along the optical path, particularly, altering a beam waist of a Gaussian beam and an imaging position to greatly increase optical efficiency of collimators for the whole system.

4 Claims, 10 Drawing Sheets

MULTI-CHANNEL WAVELENGTH DIVISION MULTIPLEXING/DEMULTIPLEXING DEVICE

BACKGROUND OF THE INVENTION

1. Field of the Invention

The present invention generally relates to an optical device, and more specifically to a multi-channel wavelength division multiplexing/demultiplexing employing at least one microlens, each inserted between two adjacent optical filters along a preset optical path to adjust an optical beam shape and alter a beam waist of a Gaussian beam and an imaging position, thereby greatly increasing optical efficiency of collimators for the whole optical system.

2. The Prior Arts

In the optical application field, some Multiplexing/Demultiplexing module is often needed to implement a Multiplexing/Demultiplexing (MUX/DEMUX) function. For MUX, a plurality of incident light beams are incorporated to generate and output an mixed light beam, and each incident light beam has a different range of wavelength. For DEMUX, one incident light beam with a broad range of wavelength is processed to extract and output a plurality of light beams, each serving as an output light beam and having a different range of wavelength. Particularly, optical filters are generally employed to achieve the above optical function for incorporation/separation, and a plurality of collimators are also collaborated to implement high efficiency of receiving and transmitting the light beam(s).

Further, two MUX/DEMUX modules in the prior arts are commonly used. Specifically, one module is implemented by incorporating a plurality of discrete single channel elements configured in series as shown in FIG. 1A, and the other is through Free Space Optics (FSO) to form a zigzag structure in a free space by combining a plurality of optical filters as shown in FIG. 1B.

For the WDM products manufactured through the technique of the FSO, optical insertion loss primarily comes from collimator misalignment and optical beam shape mismatch. The optical fiber collimator for best fitting to a different distance is used to reduce optical insertion loss caused by optical beam shape mismatch, and more often, a plurality of optical fiber collimators are utilized to fulfill the demand for multi-channel product. However, as the number of desired channels increases, optical insertion loss for a long optical path is not effectively reduced by the optical fiber collimators.

To solve the above issue of collimator misalignment, U.S. Pat. No. 7,212,343 in the prior arts taught a MUX/DEMUX method, as shown in FIG. 2A. One concave lens is placed in the optical path to compensate tilt error of the optical filter, thereby reducing the collimator misalignment. More specifically, the position of the concave lens is at an incident traveling distance, which is close or equal to a reflective traveling distance, such that tilt error due to inserting the optical filters continuously diminishes and optical insertion loss decreases. However, the above skill only works for the concave lens, which is needed to be placed at the position of the ½ distance from the optical filter for optimal performance. Thus, U.S. Pat. No. 7,212,343 is greatly limited in the actual application.

Another solution in the prior arts to solve collimator mismatch issue is disclosed by U.S. Pat. No. 7,031,610, which illustrates a diffraction-compensated WDM (wavelength division multiplexer), as shown in FIG. 2B. The WDM employs the optical filter implemented by a concave lens to reshape the light beam. For the reflective light, the lenses type of optical filter is identical to a concave mirror, which utilizes a curved surface to implement diffraction compensation. In other words, U.S. Pat. No. 7,031,610 uses a filtering element, which specifically has the curve surface, but the position of the filtering element is quite limited by the position of the original filter. Thus, it is difficult to optimize the optical beam shape in the actual application.

Therefore, it is greatly needed to provide a new multi-channel wavelength division multiplexing/demultiplexing device, which employs at least one microlens, each inserted between two adjacent optical filters along a preset optical path, to adjust an optical beam shape of a light beam and alter a beam waist of a Gaussian beam and an imaging position, thereby greatly increasing optical efficiency of collimators for the whole optical system, and overcoming the above problems in the prior arts.

SUMMARY OF THE INVENTION

The primary object of the present invention is to provide a multi-channel wavelength division multiplexing/demultiplexing device for N optical channels, and N is a positive integer equal to or greater than one. The device of the present invention generally comprises N optical filters and at least one microlens. The N optical filters are employed to guide a light beam to travel along a preset zigzag optical path, and each optical filter has a different range of wavelength configured for one of the N optical channels. Further, the optical filter has a first surface and a second surface, which are opposite to each other. Specifically, the first surface is intended to receive incident light and transmit reflective light, and the second surface transmits outgoing light, which penetrates the optical filter as one output beam for the corresponding optical channel.

Each microlens is configured and placed between two adjacent optical filters along the optical path to adjust an optical beam shape of the traveling light beam along the optical path. Particularly, the microlens has at least one curved surface, and can be implemented by a concave or convex lens.

For the light beam as a Gaussian beam, the microlens alters and adjusts its beam waist to further increase optical efficiency of the collimators while receiving the light beam.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention, and together with the description, serve to explain the principles of the invention.

Figure 1A:
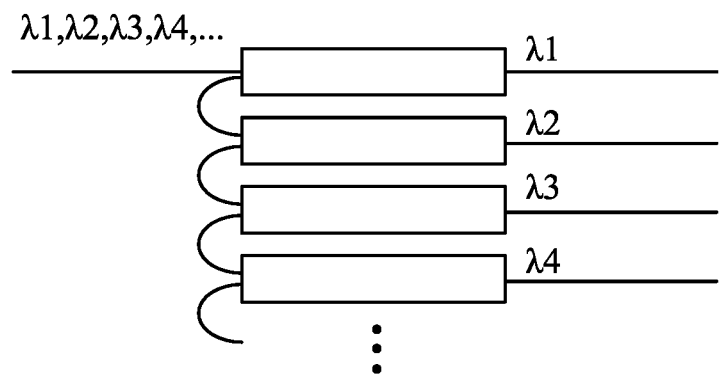
FIG. 1A is a view showing one of the MUX/DEMUX modules incorporating a plurality of discrete single channel elements in series in the prior arts.
Figure 1B:
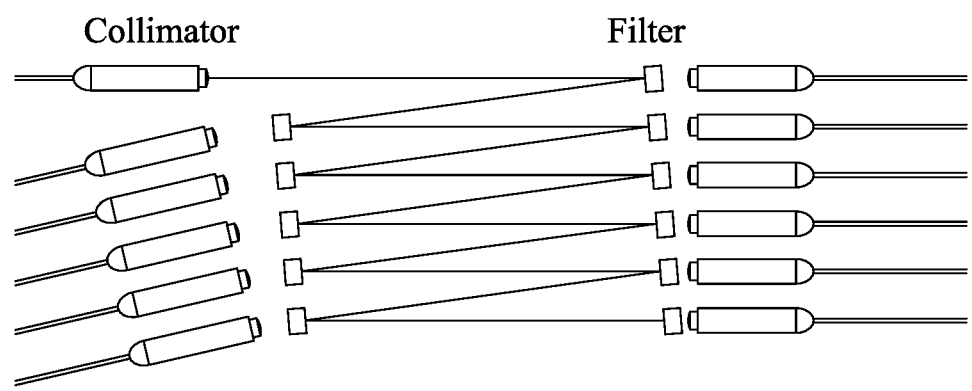
FIG. 1B is a view showing another MUX/DEMUX module forming a zigzag structure in a free space by combining a plurality of optical filters through FSO in the prior arts.
Figure 2A:
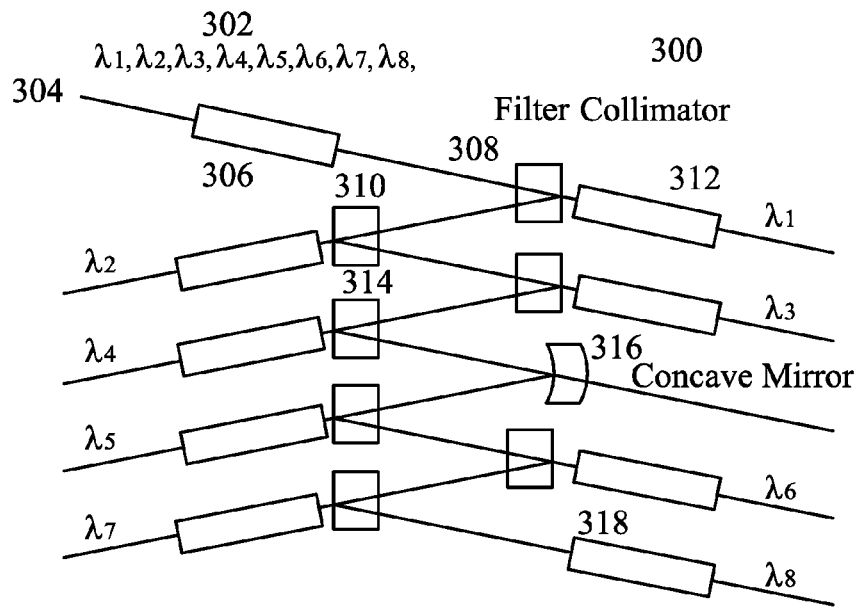
FIG. 2A is a view showing one concave mirror placed in the optical path to compensate tilt error caused by inserting the optical filter in the prior arts.
Figure 2B:
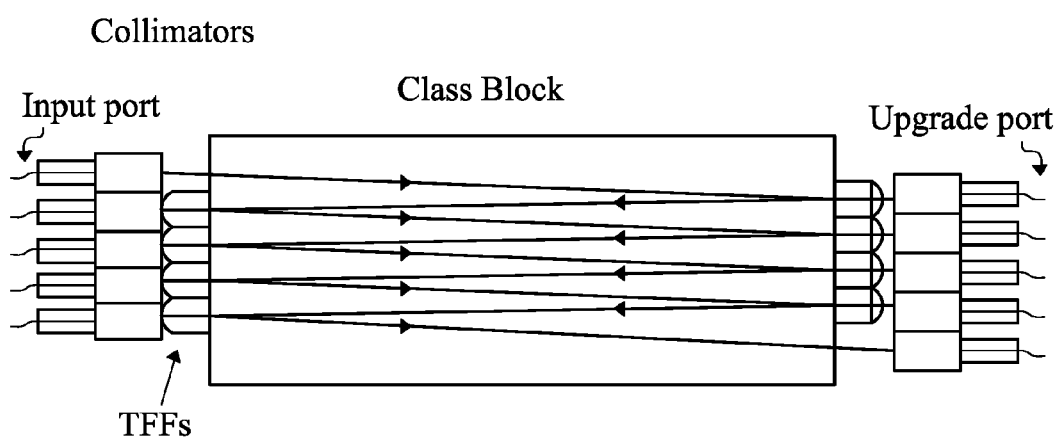
FIG. 2B is a view showing the WDM for solving collimator mismatch by diffraction compensation in the prior arts.
Figure 3:
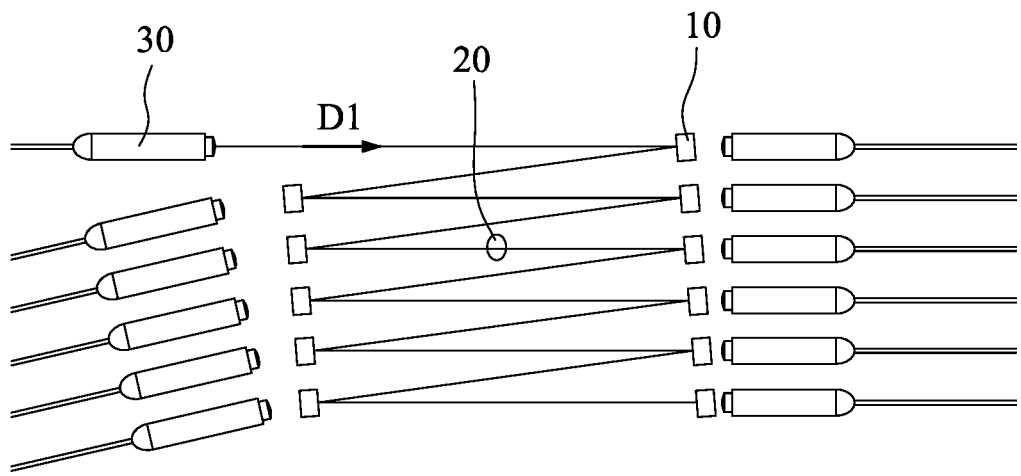
FIG. 3 is a view showing the multi-channel wavelength division multiplexing/demultiplexing device according to the embodiment of the present invention.

Please refer to FIG. 3 illustrating the multi-channel wavelength division multiplexing/demultiplexing (MUX/DEMUX) device according to the embodiment of the present invention, intended to perform a MUX/DEMUX function for N optical channels, wherein N is a positive integer equal to or greater than one. As shown in FIG. 3, the MUX/DEMUX device of the present invention generally comprises N optical filters 10 for the N respective optical channels, and at least one microlens 20. It should be noted that FIG. 3 just shows single one microlens 20 as an illustrative example for clearly explanation.

Specifically, the N optical filters 10 are configured to guide the light beam to travel along the preset optical path such as the traveling direction D1, and each optical filter 10 is configured for one of the N optical channels. It should be noted that the traveling direction D1 shown in FIG. 3 is only intended to explain the demultiplexing (DEMUX) function, and if the light beam actually travels in an opposite direction with respect to the traveling direction D1, the device of the present invention performs the multiplexing (MUX) function. However, the following description is only focused on the DEMUX function based on the direction D1.

In addition, each optical filter 10 is configured for a different and specific range of wavelength, and has a first surface and a second surface opposite to each other, serving as an incident surface and an outgoing surface, respectively. In other words, an incident light is incident on the first surface, a reflective light reflected by the optical filter 10 travels outwards through the first surface, and a transmitting light penetrates the optical filter 10 and travels outwards through the second surface. The transmitting light is substantially the output beam for the corresponding optical channel.

Furthermore, the microlens 20 is installed between two adjacent optical filters 10 along the optical path to adjust the optical beam shape of the light beam. As shown in FIG. 3, the microlens 20 is distant from surfaces of the two adjacent optical filters. Particularly, the microlens 20 has at least one curved surface, and is preferably implemented by a convex or concave lens.

The device of the present invention further comprises a plurality of collimators 30, each configured for the corresponding optical filter 10. For example, the collimator 30 is directed to the incident surface of the optical filter 10 to project the incident light, or alternatively, to the outgoing surface of the optical filter 10 to receive the transmitting light. The uppermost and leftmost collimator 30 in FIG. 3 corresponds to the incident surface of the uppermost and rightmost optical filter 10, and other collimators 30 are deployed for the outgoing surface of the respective optical filters 10.

Figure 4:
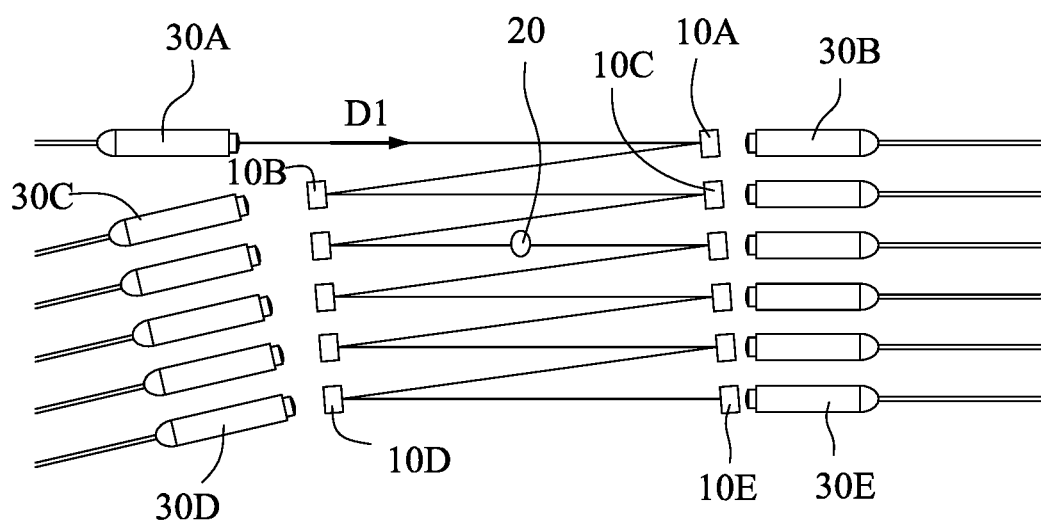
FIG. 4 is a view showing the optical filters and the collimators indicated by respective numeral symbols.

To further explain the aspects and the optical path of the present invention, refer to FIG. 4, which is similar to FIG. 3 except that respective optical filters 10 and collimators 30 are specified different numeral symbols. As shown in FIG. 4, the light beam passes the uppermost collimator 30A at the left side, and travels along the traveling direction D1 to project onto the incident surface of the uppermost optical filter 10A at the right side. In other words, the left-hand surface and the right-hand surface of the optical filter 10A are the incident surface and the outgoing surface, respectively. The transmitting light from the optical filter 10A is incident on the collimator 30B and taken as the first channel beam for output. Also, the reflective light of the optical filter 10A transmits through the incident surface of the optical filter 10A, and projects on the incident surface of the next optical filter 10B, that is, the right-hand side surface of the optical filter 10B. Then, the transmitting light of the optical filter 10B projects on the collimator 30C through its outgoing surface, taken as the second channel beam for output. Similarly, the reflective light of the optical filter 10B transmits through the incident surface of the optical filter 10B at the right-hand side, and projects on the incident surface of the next optical filter 10C, that is, the left-hand side surface of the optical filter 10C. Other collimators are configured in the same way mentioned above to form a zigzag optical path. It is noted that one of the key aspects of the present invention is that the at least one microlens 20 is inserted in the zigzag optical path, and each microlens 20 is placed between two adjacent optical filters 10. At last, the incident surface of the final optical filter 10E, that is, the left-hand side surface of the optical filter 10E, receives the reflective light of the previous optical filter 10D, and the corresponding collimator 30D is placed at the left-hand side of the optical filter 10D for outputting the last second beam. Also, the transmitting light of the optical filter 10D through its outgoing surface at the right-hand side is incident onto the collimator 30E, taken as the last channel beam for output.

Figure 5:
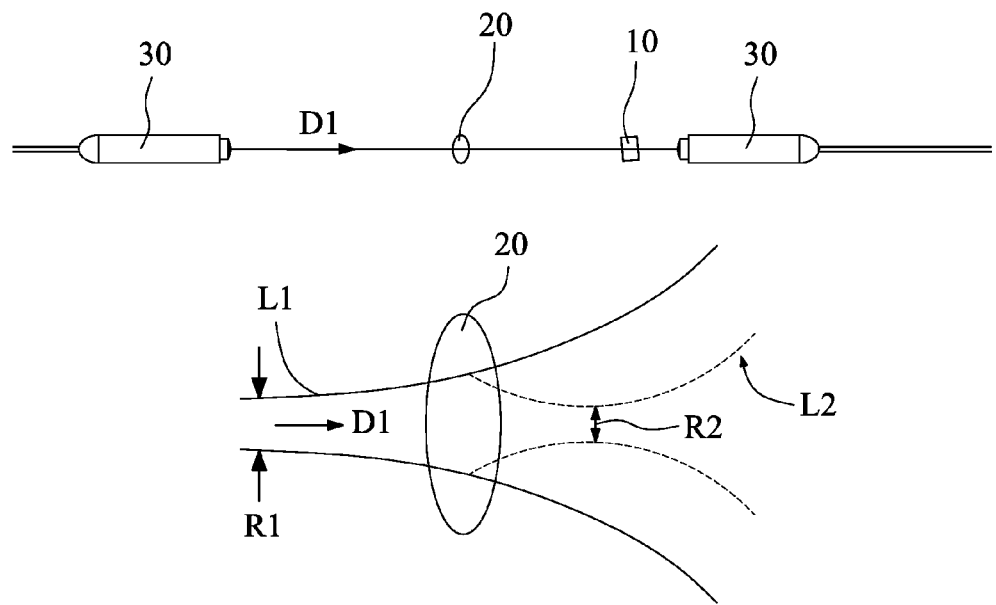
FIG. 5 is a view showing the optical beam shape adjusted by the device of the present invention.
Figure 6:
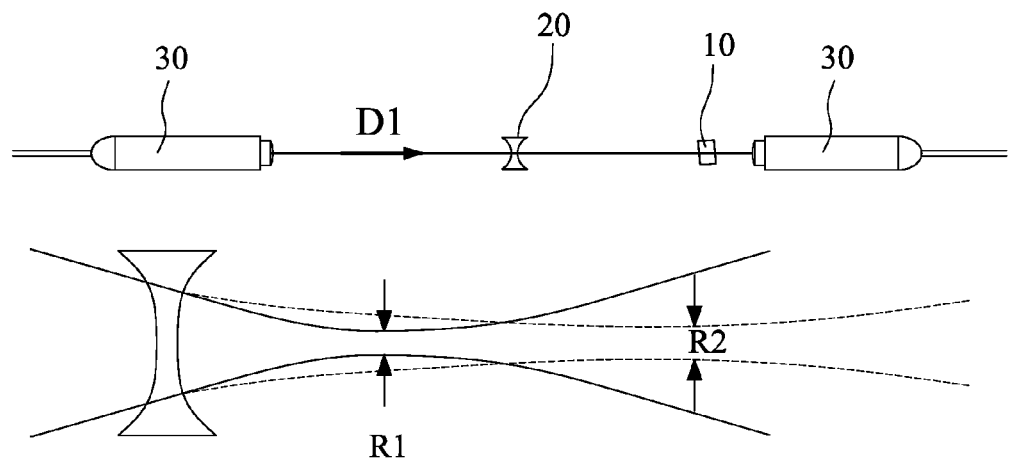
FIG. 6 is another view showing the beam optical shape adjusted by the device of the present invention.

Refer to FIG. 5 for illustrating the optical beam shape adjusted by the microlens of the device of the present invention. It should be noted that FIG. 5 only represents an illustrative example of the microlens 20 implemented by a concave microlens. The light beam mentioned above is substantially considered as a Gaussian beam having a beam waist. The light beam from the previous collimator 30 is incident on and penetrates the microlens 20 along the traveling direction D1, and further incident on the optical filter 10. The transmitting light from the optical filter 10 then projects on the next collimator 30. Specifically, the beam waist of the light beam is adjusted by the microlens 20 for reshaping so as to adapt to the collimator 30 for receiving the light. As a result, optical insertion loss due to beam shape mismatch is greatly improved. For example, the Gaussian beam L1 before reshaping is adjusted by the microlens 20 to another Gaussian beam L2, and the beam waist R2 after reshaping is obviously different from the original beam radius R1. Additionally, FIG. 6 illustrates another example of the microlens 20 implemented by a convex microlens for reshaping the light beam.

Therefore, optical property of convergence and divergence provided by the microlens of the present invention is employed to alter characteristics of the Gaussian beam such that the subsequent element effectively receives the light beam, and optical performance of final products such as IL and TDL are greatly improved. In particular, more microlenses are used to achieve multi-channel optical performance when quality of high optical channels deteriorates.

Figure 7:
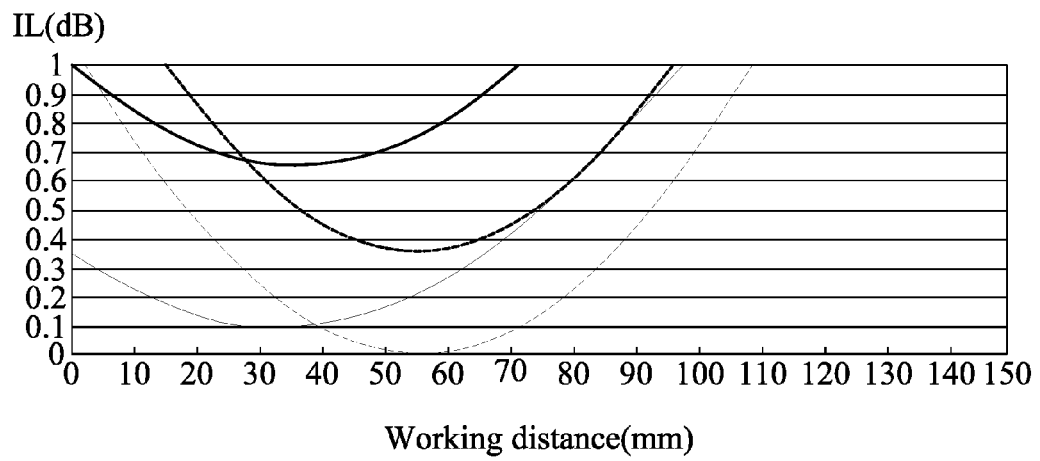
FIG. 7 is a view showing the effect of the microlens on the optical coupling efficiency.

To clearly illustrate optical improvement provided by the device of the present invention, coupling loss and tilted loss are analyzed through theoretical simulation. Here, Temperature dependent loss (TDL) basically results from collimator misalignment, and tilt misalignment is more sensitive to optical insertion loss and used to simulate TDL for comparison. As shown in FIG. 7, the fine solid line represents TDL without any microlens and tilt misalignment, the bold solid line represents TDL without any microlens for 0.05 degree of tilt misalignment, the fine dashed line represents TDL with one microlens and without tilt misalignment, and the bold dashed line represents TDL with one microlens for 0.05 degree of tilt misalignment. Obviously, working distance is not only extended but both coupling loss and tilt sensitivity are also lower.

Figure 8:
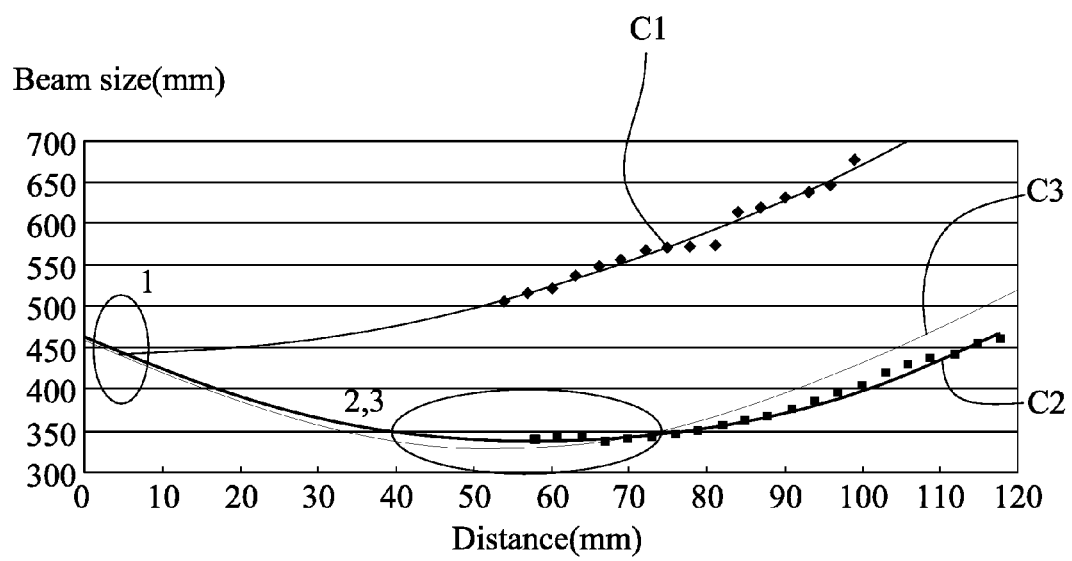
FIG. 8 is another view showing the effect of the microlens on the optical beam shape.

Refer to FIG. 8 showing another optical aspect of the light beam adjusted by the microlens of the present invention. The curve C1 shows the beam size distribution of the light beam without adding any microlens, the curve C2 is for the beam size distribution after adding one microlens, and the curve C3 is simulation result for the beam size distribution with one microlens. The microlens is placed at the cross point of the curves C1 and C2. It is apparently that the light beam is converged by the microlens, also, the radius and position of the beam waist are changed in comparison with the case without microlens as expected by the curve C3 of the simulation result. The present invention is thus feasible.

Figure 9:
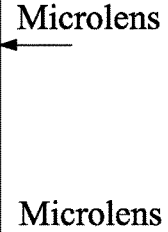
FIG. 9 is a view showing the effect of the microlens on the FSO product.

In addition, FIG. 9 shows the effect of the microlens on the Free Space Optics (FSO) product, and the technique of the FSO product can be applied to CWDM, DWDM, or any optical module for the function of wavelength MUX/DEMUX. As shown in FIG. 9, one microlens is inserted between the fourth channel(Ch4) and the fifth channel(Ch5) to reduce IL for the output beam after Ch5, and another microlens is inserted between the eighth channel(Ch8) and the ninth channel(Ch9) to reduce IL for the output beam after Ch9. Thus, the present invention is proved to improve IL by reshaping the light beam, and more than one micolens can be added to increase overall channels IL.

Figure 10A:
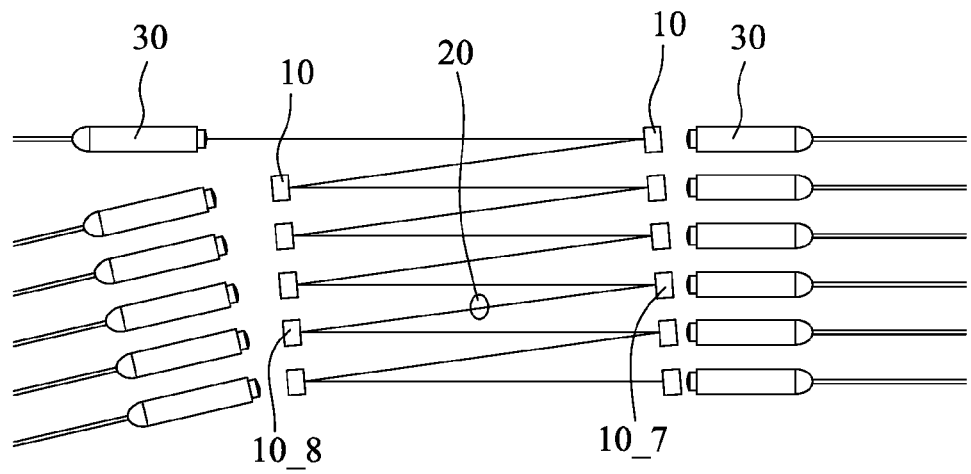
FIGS. 10A and 10B are views showing one concave microlens placed at two different positions, respectively.
Figure 10B:
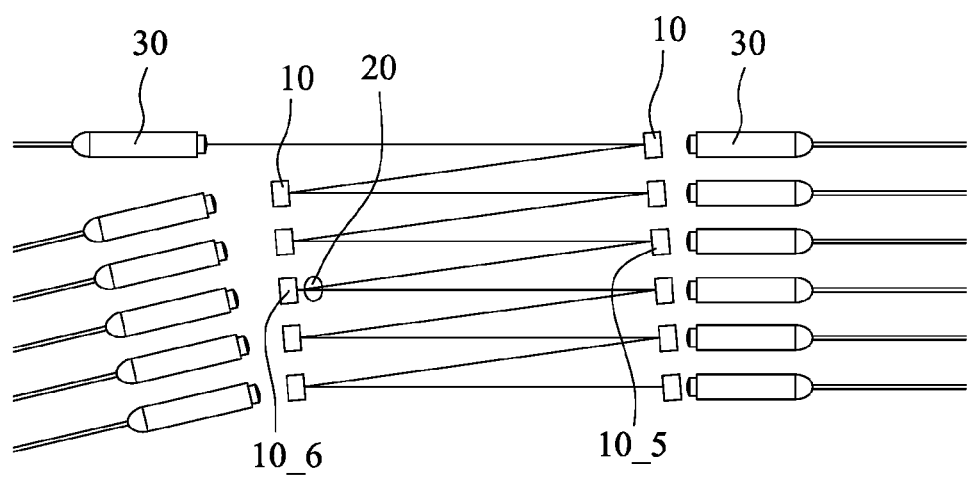
Figure 11A:
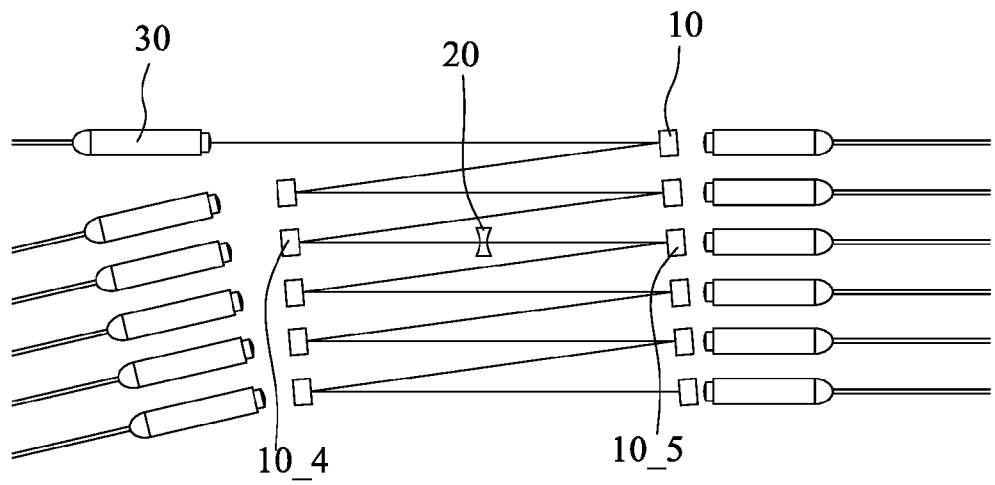
FIGS. 11A to 11C are views showing one convex microlens placed at three different positions, respectively.
Figure 11B:
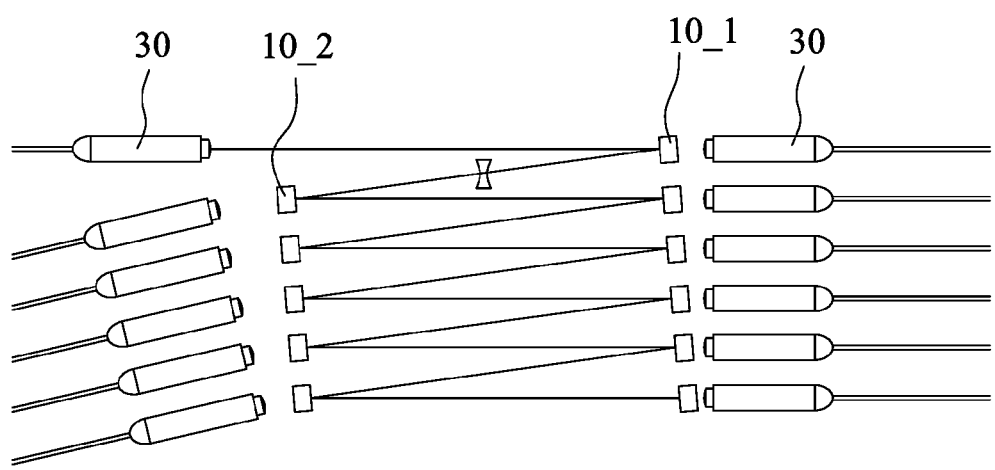
Figure 11C:
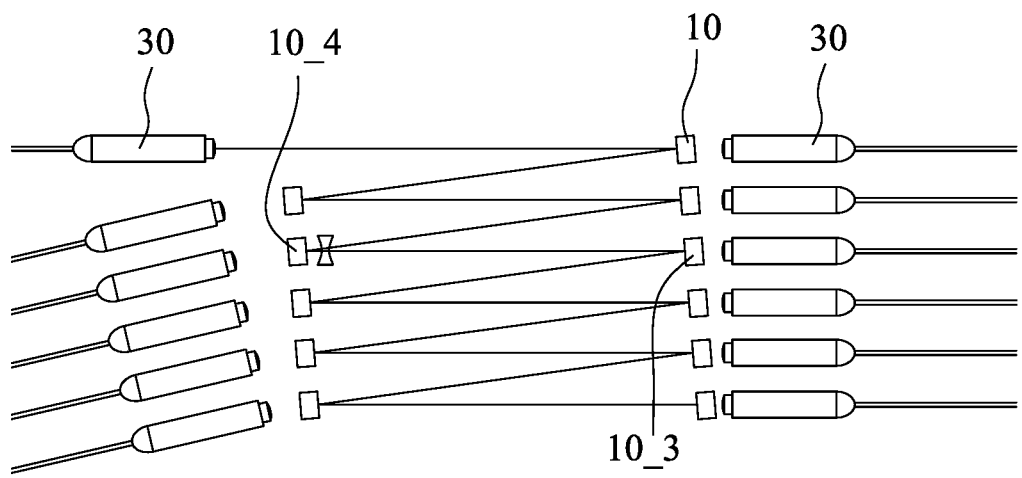

It is noted that the microlens of the device according to the present invention can be placed between any two adjacent optical filters along the optical path, as shown in FIGS. 10A and 10B. FIG. 10A illustrates that the microlens 20 is between the optical filters 10_7 and 10_8, and FIG. 10B illustrates that the microlens 20 is between the optical filters 10_5 and 10_6, particularly, closer to the optical filter 10_6 at the left-hand side. Additionally, each of the microlenses 20 shown in FIGS. 3, 4, 10A, and 10B is implemented by a convex lens, but not intended to limit the scope of the present invention. Please to refer to FIGS. 11A, 11B, and 11C for showing tree illustrative examples using a concave lens as the microlens 20. Specifically, the concave microlens 20 in FIG. 11A is placed between the optical filters 10_7 and 10_8, the concave microlens 20 in FIG. 11B between the optical filters 10_1 and 10_2, and the concave microlens 20 in FIG. 11C between the optical filters 10_3 and 10_4, and particularly closer to the optical filter 10_4 at the left-hand side.

Figure 12:
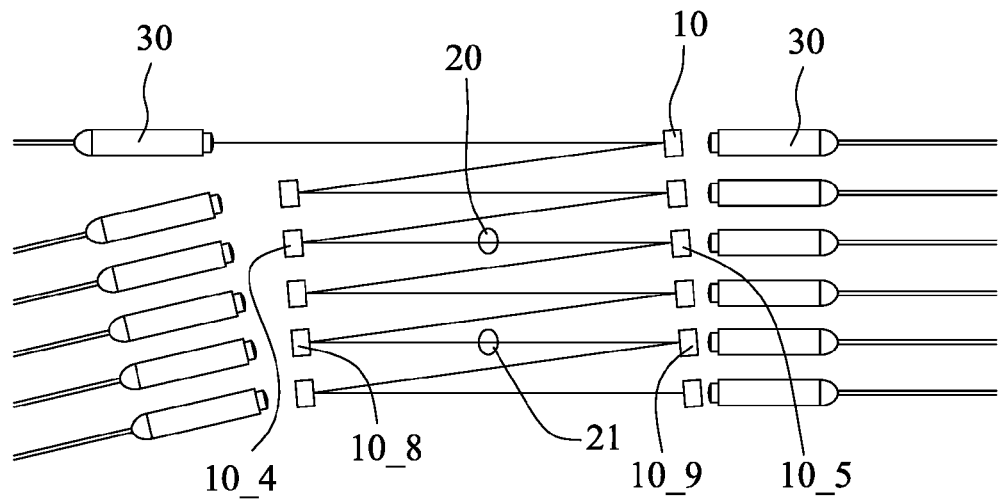
FIG. 12 is a view showing two convex microlenses included in the device of the present invention.
Figure 13:
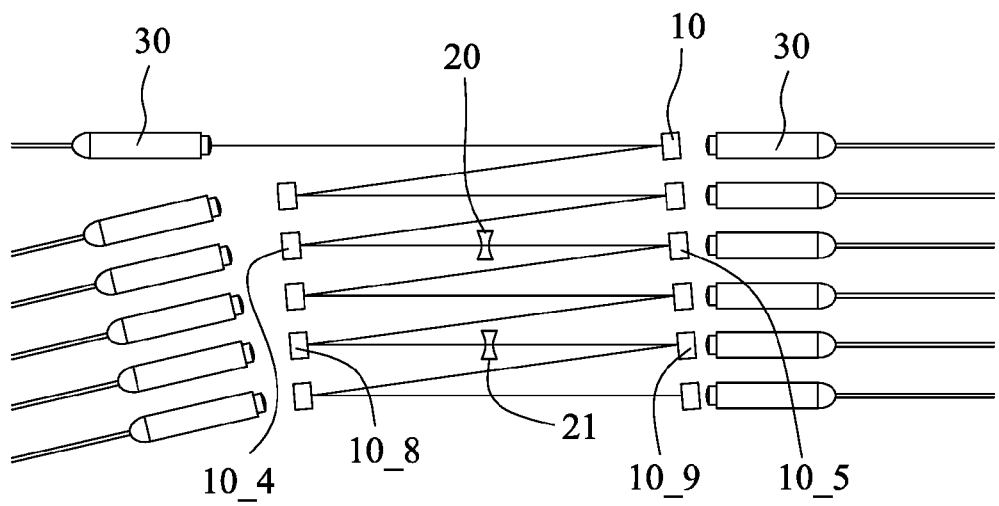
FIG. 13 is a view showing two concave microlenses included in the device of the present invention.

It should be noted that the device of the present invention may comprise one or more than one microlens, and is not limited by the illustrative examples with only one microlens shown in FIGS. 1 to 4. Particularly, each microlens is a convex or concave microlens. Please further refer to FIGS. 12 and 13. FIG. 12 shows two convex microlenses 20 and 21, wherein the convex microlens 20 is placed between the optical filters 10_4 and 10_5, and the convex microlens 21 between the optical filters 10_8 and 109. Further, FIG. 13 shows two concave microlenses 20 and 21, wherein the concave microlens 20 is placed between the optical filters 10_4 and 10_5, and the concave microlens 21 between the optical filters 10_8 and 10_9.

From the above mention, the primary feature of the present invention is that the collimators are employed to transmit and receive the light beam, and the optical filters are configured to filter out output different beams, each having a respective range of wavelength, so as to form the zigzag optical path due to reflection of the optical filters. In particular, the at least one microlens is inserted in the optical path to change and adjust the optical beam shape and imaging property of the light beam penetrating the microlens, thereby greatly increasing efficiency of the collimators for receiving the light beam.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-channel wavelength division multiplexing/demultiplexing device for N optical channels, N being a positive integer equal to greater than one, comprising:
    N optical filters guiding a light beam along a preset zigzag optical path, each optical filter with a different range of wavelength being configured for one of the N optical channels, and having a first surface and a second surface opposite to the first surface, the first surface intended to receive incident light and transmit reflective light, the second surface intended to transmit outgoing light penetrating the optical filter as one output beam for the corresponding optical channel; and
    at least one microlens, each microlens configured between two adjacent optical filters along the optical path to adjust an optical beam shape of the traveling light beam along the optical path, and each microlens being distant from the surfaces of the two adjacent optical filters, wherein the microlens has at least one curved surface.

2. The device as claimed in claim 1, wherein the microlens is a concave lens or a convex lens.

3. The device as claimed in claim 1, further comprising a plurality of collimators configured for the respective optical filters.

4. The device as claimed in claim 3, wherein the light beam is a Gaussian beam with a beam waist, and each microlens is intended to alter the beam waist and an imaging position for adapting to the corresponding collimator.

* * * * *